United States Patent [19]

Sakaguchi et al.

[11] Patent Number: 5,448,909

[45] Date of Patent: Sep. 12, 1995

[54] MOTOR TROUBLE DETECTION DEVICE

[75] Inventors: Masahiro Sakaguchi; Yasumi Inoue, both of Itami, Japan

[73] Assignee: Sumitomo Electric Industries, Ltd., Osaka, Japan

[21] Appl. No.: 313,581

[22] Filed: Sep. 27, 1994

[30] Foreign Application Priority Data

Oct. 1, 1993 [JP] Japan .................. 5-246766
Sep. 8, 1994 [JP] Japan .................. 6-214619

[51] Int. Cl.⁶ .................................................. G01L 5/28
[52] U.S. Cl. ........................................ 73/121; 364/426.1
[58] Field of Search ............ 73/121, 123, 118.1; 364/426.01, 426.02; 303/92, 93

[56] References Cited

U.S. PATENT DOCUMENTS

| | | | |
|---|---|---|---|
| 4,831,532 | 5/1989 | Kondo | 303/93 |
| 4,872,730 | 10/1989 | Takagi et al. | 73/121 |
| 5,005,405 | 4/1991 | Ishizeki | 73/123 |
| 5,170,343 | 12/1992 | Matsauda | 303/92 |
| 5,236,254 | 8/1993 | Müller et al. | 303/92 |

FOREIGN PATENT DOCUMENTS

| | | |
|---|---|---|
| 0471951 | 2/1992 | European Pat. Off. |
| 3819490 | 12/1989 | Germany |
| 3902131 | 7/1990 | Germany |
| 3-75377 | 11/1991 | Japan |

OTHER PUBLICATIONS

European Search Report and Annex.

Primary Examiner—Richard E. Chilcot, Jr.
Assistant Examiner—Max Noori
Attorney, Agent, or Firm—Sandler, Greenblum & Bernstein

[57] ABSTRACT

A motor trouble detection device detects trouble in a motor used in an anti-skid brake control system for returning the brake fluid to the reservoir tank. The trouble detection is based on the counter electromotive force generated by the motor which is turned off after driving for a predetermined period. The device includes a first detector for judging whether the counter electromotive force is smaller than a predetermined voltage and a second detector for judging whether the motor is in trouble based upon the first detector.

13 Claims, 9 Drawing Sheets

MOTOR TROUBLE DETECTION DEVICE

BACKGROUND OF THE INVENTION

1. Field of the Invention

The present invention relates to a motor trouble detection device for use in an anti skid brake control system and particularly suitable for detection of locking state of a pump motor for circulating brake fluid.

2. Description of the Prior Art

Figure 8:
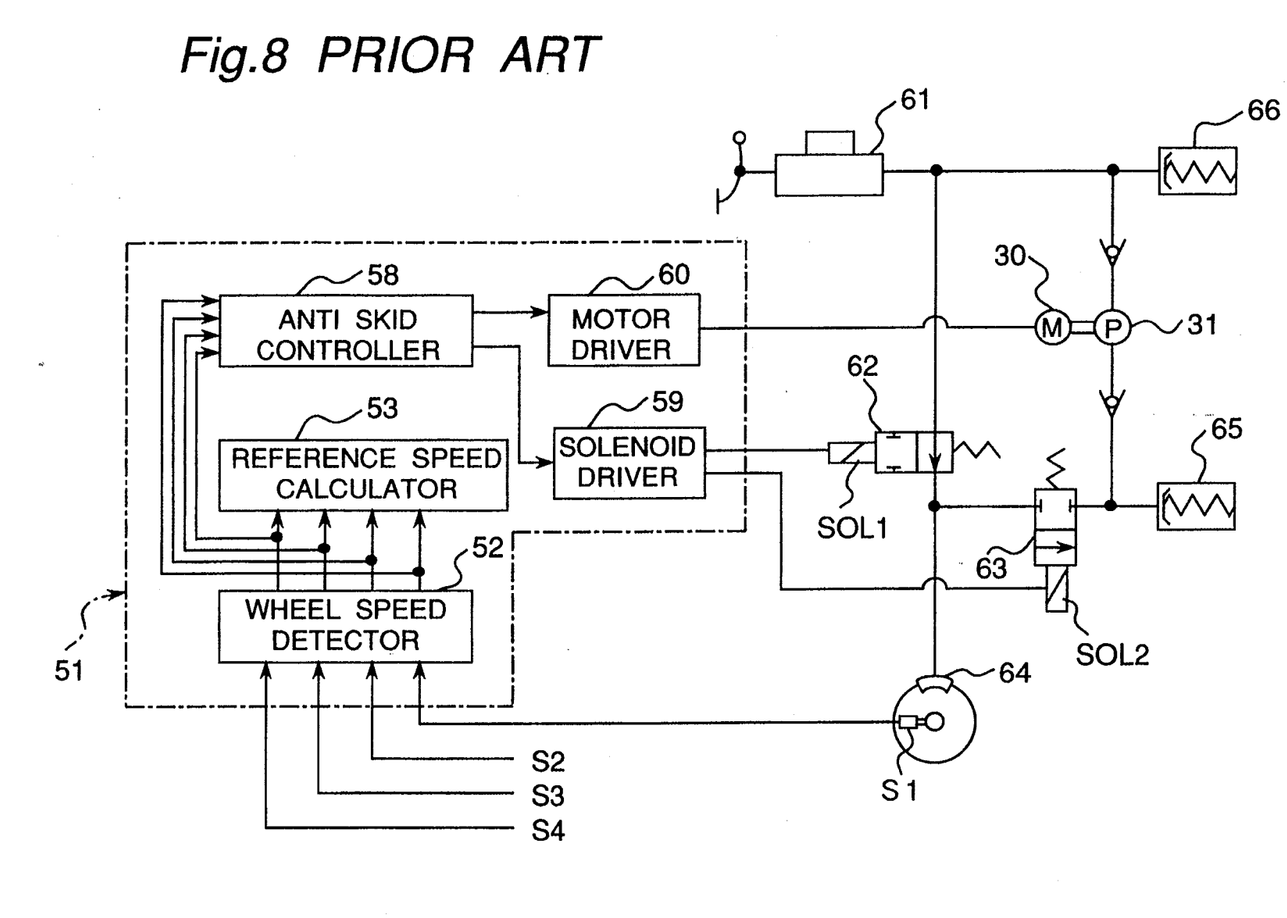
FIG. 8 is a block diagram showing a conventional anti skid brake control system.

As shown in FIG. 8, an anti skid brake control system (ABS) of a fluid circulation type includes an electronic control unit 51 which performs various computations and judgements based on the signals from wheel speed sensors S1, S2, S3, and S4 each respectively provided to wheels. The ABS further produces control signals for pressure control valves of its hydraulic system to control brake fluid pressure properly.

The electronic controller 51 is comprised of a wheel speed detector 52, a reference speed calculator 53, an anti skid controller 58, a solenoid driver 59, and a motor driver 60. The wheel speed detector 52 calculates actual wheel speed of each wheel based on the signals from each of sensors S1, S2, S3, and S4. The reference speed calculator 53 produces a reference speed signal based on the calculated actual wheel speeds.

The anti skid controller 58 judges that a wheel is locked when the reference speed signal is greater than the actual wheel speed(s) by a predetermined value, and gives a solenoid driver 59 a pressure reduction instruction to energize solenoids SOL1 and SOL2. A solenoid valve 62, which is normally opened, closes a brake fluid supply path extending from a fluid pressure source constructed by a master cylinder 61 and an accumulator 66. A solenoid valve 63, which is normally closed, closes a fluid discharge path. As a result, a brake fluid in a brake cylinder 64 flaws into a reservoir tank 65, and the brake fluid pressure in the brake cylinder 64 reduces.

As the brake fluid pressure reduction starts, the motor driver 60 makes a motor 30 to start so that a pump 31 sucks the brake fluid in the wheel cylinder 64 and returns the sucked brake fluid to the fluid supply side. However, when the wheel speed indicative of a locking symptom is improved by the fluid pressure reduction, the difference between the reference speed and the actual wheel speed(s) becomes smaller than the predetermined value. In this case, the anti skid controller 58 judges that the wheel(s) is released from the locked state, and gives the solenoid driver 59 a pressure increasing instruction to release the solenoids SOL1 and SOL2. As a result, the solenoid valves 62 and 63 return to the normal condition, as depicted in FIG. 8, and are ready for increasing the brake pressure.

According to the anti skid control brake system of a fluid circulation type, it is necessary to keep the pump driving motor being rotated while the brake fluid temporarily sucked from the wheel cylinder during the brake pressure reduction is forcibly returned to the master cylinder 64. However, if the motor does not rotate, it is impossible to perform the anti skid brake control properly. Therefore, a warning device is preferably provided for giving a warning to a vehicle driver when the motor is troubled.

Figure 9:
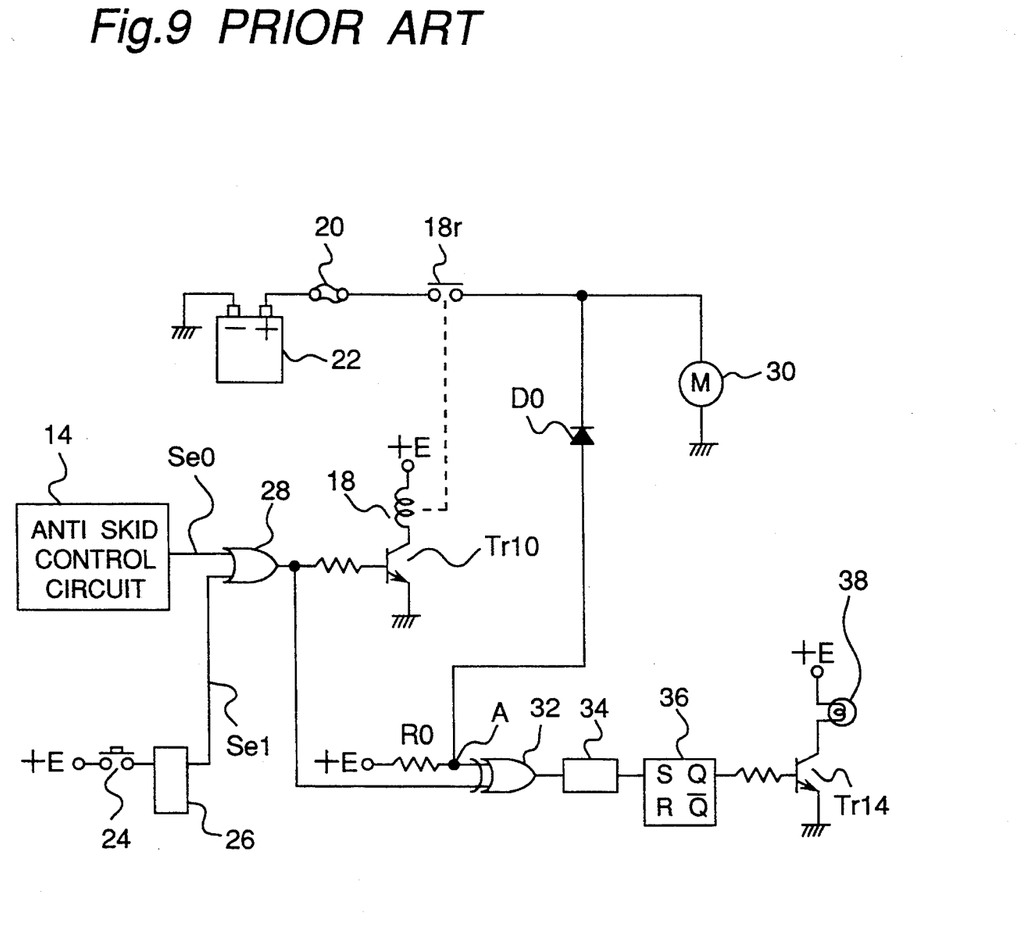
FIG. 9 is a block diagram showing the construction of a conventional motor trouble detection device used in the anti skid brake control device of FIG. 8.

An example of such a warning device was proposed in Japanese Patent Pulication (examined) No. H3-75377 issued Nov. 29, 1991, as shown in FIG. 9. A motor trouble detection circuit includes an anti skid control circuit 14 which calculates and produces a hydraulic pressure signal enabling that the wheels can obtain the maximum braking efficiency but does not go into a skid. The anti skid control circuit 14 produces and inputs a motor driving signal Se0 to one of input terminals of an OR-gate 28. A relay 18 is excited by the "turn-on" of a transistor Tr10 whose base is applied with the motor driving signal Se0 through the OR-gate 28. The relay 18 has a contact point 18r through which an electric power from a battery 22 is supplied to the motor 30 for driving the pump 31, when the contact point 18r is closed. A fuse 20 is provided between the battery 22 and the contact point 18r. An operation switch 24 is provided for testing the warning device. A mono-stable multivibrator 26 is driven according to a voltage impressed thereto by operating the switch 24, and outputs a pulse signal Se1 for a predetermined period. This pulse signal Se1 is applied to the other input terminal of the OR-gate 28.

The warning device further includes a trouble detection and display means comprised of an exclusive OR-gate 32, a timer 34, a R-S flip-flop 36, a transistor Tr14, and a lamp 38, connected as shown in FIG. 9, is provided. The lamp 38 is lit up when other member of the warning device are turned on. The exclusive OR-gate 32 has two input terminals; one is connected to the output terminal of OR gate 28 and the other is connected to an electric power source +E through a resistance R0 whose value of resistance is well greater than the direct current resistance of the motor 30. The latter of input terminals of gate 32 is further connected to a contact point A provided therein to the motor 30 through a diode D0 for supplying a continuous current which is a pilot current.

Here, the operation of thus constructed warning device is described. First, when the operation switch 24 is off, the output from the mono-stable multivibrator 26 is low. Therefore, the output from the OR-gate 28 is also low. Furthermore, the pilot current is flowing to the motor 30 through the diode D0 from the contacting point A. Therefore, the exclusive OR-gate 32 outputs a low level signal, As a result, each of members 36, Tr14, and 38 after the timer 34 does not operate.

However, when the motor 30 has a wire thereof broken, the pilot current is shut off so that the electrical potential at the contact point A is approximately the same as that of the electric source +E. Therefore, one of input terminals of exclusive OR-gate 32 becomes high, causing the exclusive OR-gate 32 to output a high level signal. A predetermined period after receiving this high level signal, the timer 34 outputs a high level signal causing the R-S flip flop 36 to be reset. The R-S flip flop 36 outputs a high level signal from an output terminal Q thereof, and the transistor Tr14 is turned on. As a result, the lamp 38 is lit so as to indicate that the motor 30 has a breaking of wire.

When the operation switch 24 is turned on, the OR gate 28 outputs a high level signal on receipt of the pulse signal Se1 from the mono-stable vibrator 26. Due to this high level signal, the relay 18 is excited to close the contact 18r. Since the motor 30 rotates if the motor 30 is normal and not troubled, it is possible to know that the motor 30 is in a normal condition by hearing the sound of the motor 30 which is rotating.

In this case, the high level signal from the OR-gate 28 is input to one of input terminals of the exclusive OR-gate 32. Furthermore, another high level signal is input to the other input terminal of the exclusive OR-gate 32 when the motor 30 rotates properly. Therefore, the exclusive OR-gate 32 outputs a low level signal, allowing the lamp 38 being not lit. However, just after the operation switch 24 is turned on, the terminal voltage of the motor 30 is zero due to an operational time lag of the contact 18r of relay 18. Accordingly, the voltage at the contact point A becomes low, and the warning lamp 38 is lit up to giving a warning of the motor trouble contrary to the fact. To prevent such an operational error of the warning lamp 38, the timer 34 is provided.

However, it is possible that the motor spindle is mechanically locked so that the motor spindle can not rotate, even if the motor 30 has no breakage of wire. In this case, since the potential at the input point A of the exclusive OR-gate 32 is high, the exclusive OR-gate 32 outputs a low level signal. Therefore, the warning lamp 38 is left as being not lit contrary to the fact that the motor spindle is locked and can not rotate. Thus, it is judged in error that the motor 30 is not troubled.

It is possible to detect the motor trouble even when the motor spindle is locked by monitoring the current on the side of motor driving circuit. However, a special circuit is necessary for the detection of this current, resulting in the increased cost of the device.

SUMMARY OF THE INVENTION

The object of the present invention is therefore to provide an improved motor trouble detection device which solves these problems.

In order to achieve the aforementioned objective, a motor trouble detection device for use in an anti skid brake control system for releasing a wheel of a vehicle from a locked condition such that brake fluid in a master cylinder is forcibly discharged to a reservoir tank, and the brake fluid in the reservoir tank is further returned to the master cylinder by a pump driven by a motor, said device comprises a voltage detection means for detecting a counter electromotive force generated by said motor; a first judging means for judging whether said detected counter electromotive force is smaller than a predetermined voltage, or not, when said motor is turned off; and a second judging means for judging whether said motor is in trouble or not based on the judged result by said first judging means.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
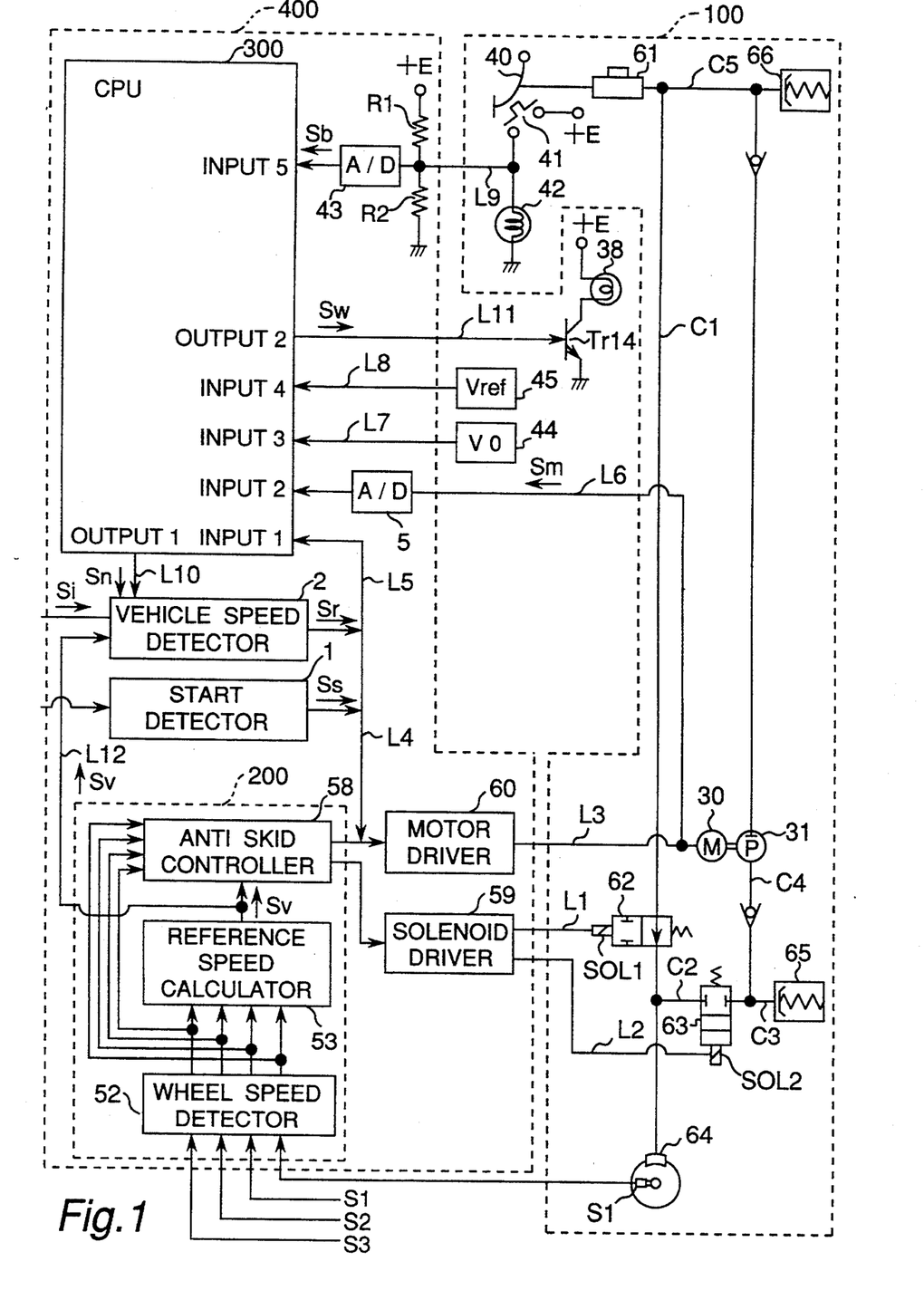
FIG. 1 is a block diagram showing an anti skid brake control system wherein a motor trouble detection device according to an embodiment of the present invention is incorporated.

Referring to FIG. 1, a motor trouble detection device according to a preferred embodiment of the present invention used in an anti skid brake control system is shown. In the embodiment, the anti skid brake control system is installed in, for example, a four-wheel vehicle. However only one wheel is shown for the sake of brevity. The motor trouble detection device includes a braking pressure unit 100 for controlling braking pressure, an anti skid control unit 200 for controlling the operations of the braking pressure unit 100, and trouble detection unit 300 for detecting that the motor for the hydraulic pump of the braking pressure unit 100 is troubled.

The brake pressure unit 100 includes a brake master cylinder 61 which is operated by a brake pedal 40, an inlet valve 62 which is normally opened, a brake cylinder 64, an outlet valve 63 which is normally closed, a reservoir 65, a pump 31, a motor 30 which drives the pump 31 for flowing the fluid to generate fluid pressure, and an accumulator 66.

The inlet valve 62 is comprised of a solenoid SOL1. The input and output ports of the inlet valve 62 are connected to an output port of the master cylinder 61 by a first fluid line C1 and to an input port of the outlet valve 63 by a second fluid line C2, respectively. The brake cylinder 64 is connected to the fluid line C2.

The outlet valve 63 is comprised of a solenoid SOL2, and is actuated. Then the outlet valve 63 passes the fluid therethrough or not. The reservoir 65 is connected to the output port of the outlet valve 63 by a third fluid line C3, and temporarily stores the brake fluid discharged from the outlet valve 63.

The pump 31 has an input port connected to the third fluid line C3 by a fourth fluid line C4 having a check valve incorporated therein. The pump 32 also has an output port connected to the first fluid line C1 by a fifth fluid line C5. The accumulator 66 is connected to the fifth fluid line C5. The pump 31 is driven by the motor 30 to pump up the brake fluid from the reservoir 65 and/or the outlet valve 63 for returning to the first fluid line C1 extending between the master cylinder 61 and the inlet valve 62. The anti skid brake control system utilizing this type of fluid circuit is referred to as "a fluid circulation type". A brake switch 41 is further provided for detecting the vehicle driver's braking operation to produce a braking signal Sb. A braking lamp 42 is connected to the braking switch 41 for indicating the braking operation based on the braking signal Sb.

The anti skid control unit 200 includes wheel sensors S1, S2, S3, and S4 for detecting respective wheel speeds and producing pulse signals. The anti skid control unit 200 performs various computations and judgments based on the signals from those sensors S1, S2, S3, S4. The anti skid control unit 200 is comprised of a wheel speed detector 52, a reference speed calculator 53, and an anti skid controller 58, a solenoid driver 59, and a motor driver 60, which are connected to each other as depicted in FIG. 1. The solenoid driver 59 is connected to the solenoids SOL1 and SOL2 by first and second lines L1 and L2, respectively. The motor driver 60 is connected to the motor 30 by a third line L3.

The wheel speed detector 52 counts pulse signals which are alternating currents from the speed sensors S1, S2, S3, and S4, and calculates an actual wheel speed of each wheel. The reference speed calculator 53 calculates an average value of the greatest and the second greatest ones of thus obtained four actual wheel speeds, and produces a detected vehicle speed signal Sv used as a reference velocity for the anti skid brake control operation. Instead of the detected vehicle speed, a detected wheel speed Sv can be used.

The anti skid controller 58 detects the locking state of wheels based on the detected wheel speeds from the wheel speed detector 52 and the detected speed signal Sv from the reference speed calculator 53. The anti skid controller 58 further calculates the braking operations suitable for the detected locking state, and produces solenoid and motor signals for instructing the solenoid driver 59 and the motor driver 60, respectively.

Then, the solenoid drivers 59 outputs first and second solenoid driving signal to the first and second solenoid SOL1 and SOL2 through the first and second lines L1 and L2, respectively. The motor driver 60 outputs a motor driving signal to the motor 30 through the third line L3. Thus, braking pressure of each wheel is controlled. It is to be noted that the anti skid control unit 200 can be constructed by a software stored in a CPU.

The motor trouble detection device further includes a start detector 1 for detection of the operation of sel-motor (not shown) of the vehicle, and is connected to the input port of the motor driver 60 by a fourth line L4. Upon detection of the starting operation of sel-motor, the start detector 1 produces and transfers a starting signal Ss which appears high level for a first predetermined period T1 to the motor driver 60 through the fourth line L4. The period T1 is a time long enough for the motor 30 and pump 31 to discharge the brake fluid fully stored in the reservoir 65 when the pressure applied to the discharging side of the pump 31 is equal to the atmospheric pressure, in other words, when the brake pedal 40 is not operated by the vehicle driver.

A vehicle speed detector 2 has first and second input ports connected to the line between the reference speed calculator 53 by a line L12 for receiving the detected speed signal Sv and an ignition switch (not shown) for detecting the secondary voltage signal Si thereof. The vehicle speed detector 2 has an output port connected to the fourth line L4. The vehicle speed detector 2 detects that the vehicle speed reaches a predetermined velocity, and produces a vehicle signal Sr based on the detected speed signal Sv and the secondary voltage Vi. Then, the vehicle speed detector 2 produces successively nine pulses at a predetermined interval as the vehicle signal Sr such that these nine pulses show high level for a second predetermined period T2 in total. T2 is a period long enough for the motor 30 and pump 31 to discharge the brake fluid fully stored in the reservoir 65 even when the fluid pressure by the operating the brake pedal 40 is applied to the discharging side of the pump 31. Thus produced vehicle signal Sr is transferred to the motor driver 60 through the fourth line L4.

The trouble detection unit 300 performs various operations according to signals produced by the other units 100 and 200, and the detectors 1 and 2, and detects the motor trouble by a software stored in a CPU. The trouble detection unit 300 has five input ports INPUT 1, INPUT 2, INPUT 3, INPUT 4, and INPUT 5.

The INPUT 1 is connected to the fourth line L4 by a fifth line L5 for receiving the signals Sr and Ss from the start detector 1 and vehicle speed detector 2, respectively.

The INPUT 2 is connected to the motor 30 to the third line L3 by a sixth line L6 through an analog-digital converter 5 for detecting a motor rotation signal Sm indicative of a terminal voltage Vi which is a counter electromotive force thereof.

The INPUT 3 is connected to a motor voltage source 44 which supplies a reference motor speed voltage V0 by a seventh line L7. The reference motor speed voltage V0 has a minimum voltage V0 representing the state where the motor 30 seems to be in the rotation, and is determined properly taking in consideration of the speed reducing characteristics of the motor used in the anti skid control system.

The INPUT 4 is connected to a speed voltage source 45 which supplies a reference vehicle speed voltage Vref by an eighth line L8. The reference vehicle speed voltage Vref represents a predetermined vehicle speed. When the detected wheel speed is used as the detected vehicle speed Sv, a wheel speed representing a predetermined wheel speed is used as the reference vehicle speed Vref.

The INPUT 5 is connected to a line connecting the brake switch 41 and the brake lamp 42 by a ninth line L9 on a junction point X through an analog/digital converter 43. A first resistance R1 having one end connected the connecting line between the junction point X and the converter 43 and the other end connected to the power source +E is provided. A second resistance R2 having one end connected to the first resistance R1 and the other end connected to the ground is provided.

In this construction, the electric potential Vx at the junction point X can be expressed by the following equations.

When the brake switch 41 is turned on, $$vx = E \tag{1}$$

When the brake switch 41 is turned off, $$vx = 0 \tag{2}$$

When a wire is broken between the junction point X and the junction point of resistances R1 and R3, $$Vx = E \times \{R2/(R1+R2)\} \tag{3}$$

Therefore, it is possible to detect the condition of brake switch 41 based on the signal input to the port INPUT 5.

The trouble detection unit 300 further has two output ports OUTPUT 1 and OUTPUT 2. The OUTPUT 1 is connected to the vehicle speed detector 2 by a tenth line L10 for transferring a quitting signal Sn for quitting the operation of the vehicle speed detector 2.

The OUTPUT 2 is connected to a base of transistor Tr14 by an eleventh line L11 for switching a warning lamp 38. When the motor trouble is detected, the trouble detection unit 100 produces a warning signal Sw to make the warning lamp 38 to get lit for giving a warning to the vehicle driver. The operation of the trouble detection unit 100 will be described later with reference to the flaw chart shown in FIG. 3.

Figure 2:
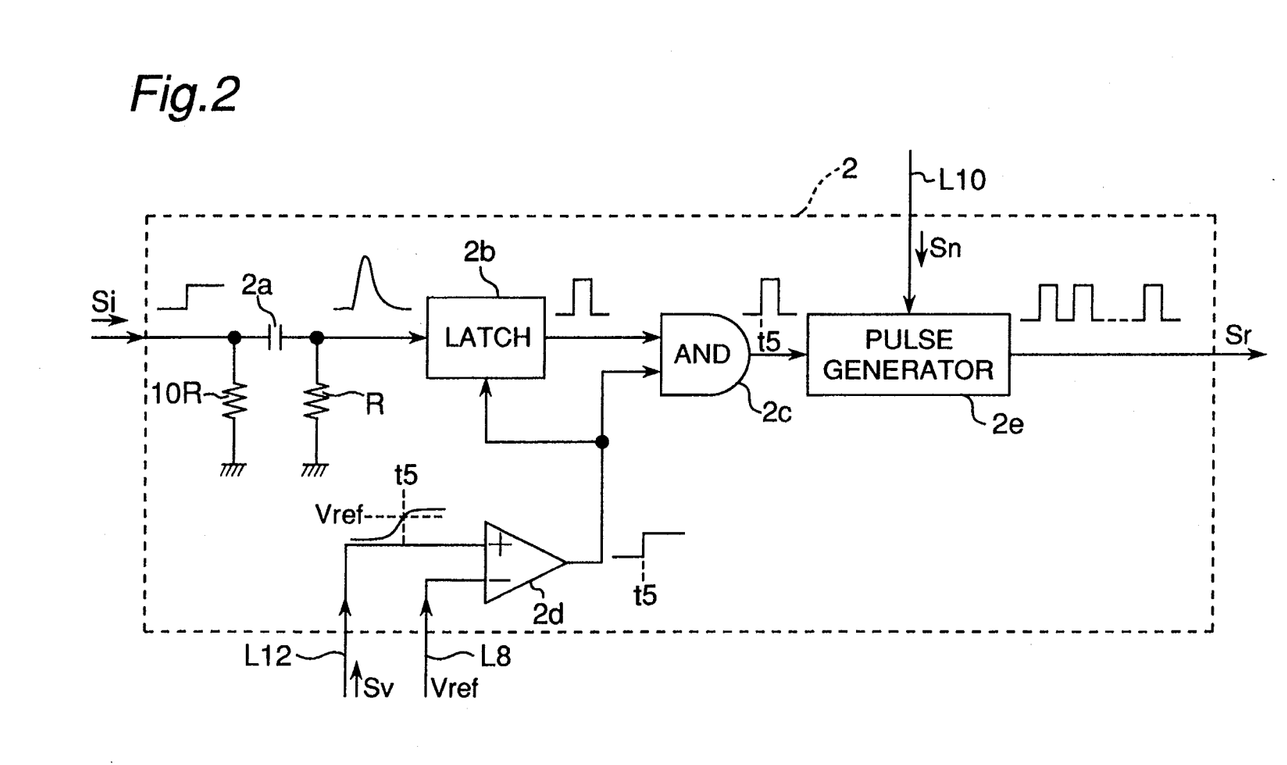
FIG. 2 is a block diagram showing the vehicle speed detector of FIG. 1.

Referring to FIG. 2, the construction of vehicle speed detector 2 is shown. The vehicle speed detector 2 has a capacitor 2a having a first end for receiving an ignition signal Si representing a secondary voltage Vi of the ignition switch (not shown). The capacitor 2a further has a second end connected to a latch 2b. The capacitor 2a is grounded by first and second resistances 10R and R connected to the first and second ends thereof, respectively. The reference symbol 10R and R indicate the resistant value of the resistances 10R and R, respectively.

A comparator 2d having two input terminals, one is connected to the reference speed calculator 53 for receiving the detected speed signal Sv, and the other is connected to a constant voltage source 45 through the line L8. The constant voltage source 45 supplies a reference voltage Vref representing the predetermined vehicle speed. The comparator 2d has an output port connected to the latch 2b for resetting thereof. When the detected speed signal Sv is greater than the reference voltage Vref, a high level signal is produced and output to the latch 2b.

An AND-gate 2c having two input terminals, one is connected to the output of the latch 2b and the other is connected to the output of the comparator 2d for receiving signals therefrom.

A pulse generator 2e comprised of a non-stable multivibrator has a first input port connected to the output of the AND-gate 2c and a second input port connected to the OUTPUT 1 of the trouble detection unit 300 for receiving the signal Sn. The pulse generator 2e successively outputs the pulse signal Sr having a frequency of $2(T2-T1)/9$ on receipt of the high level signal from the AND-gate 2c until receiving the signal Sn.

The operation of the vehicle speed detector 2 is described below. When an ignition key (not shown) is turned on at time t0, the capacitor 2a is charged with the ignition signal Si through the resistance R. This charged current is supplied to the latch 2b as a pulse voltage, so that the latch 2b outputs a signal latched at high level. Thenafter, the vehicle starts to move and increases the driving speed. When the detected speed signal Sv exceeds the reference voltage Vref (at time tS), the comparator 2d transfers a high signal to the latch 2b and the AND-gate 2c, causing the AND-gate 2c to output high to the pulse generator 2e. Then, the pulse generator 2e starts to output the pulses Sr successively at the predetermined interval to the motor driver 60 and the trouble detection unit 300 through the lines L5 and L4, respectively. Based on this pulse signal Sr, the motor driver 60 controls the rotation of the motor 30. And the trouble detection unit 300 produces and transfers the signal Sn to the pulse generator 2e through the line L10 so as to quit the operation of the generator 2e. Thus, the anti skid control unit 200, trouble detection unit 300, start detector 1, vehicle speed detector 2, solenoid driver 59, motor driver 60, analog digital converters 5 and 43, and resitance R1 and R2 construct a controller 400 of the entire of anti skid brake control system.

Figure 3:
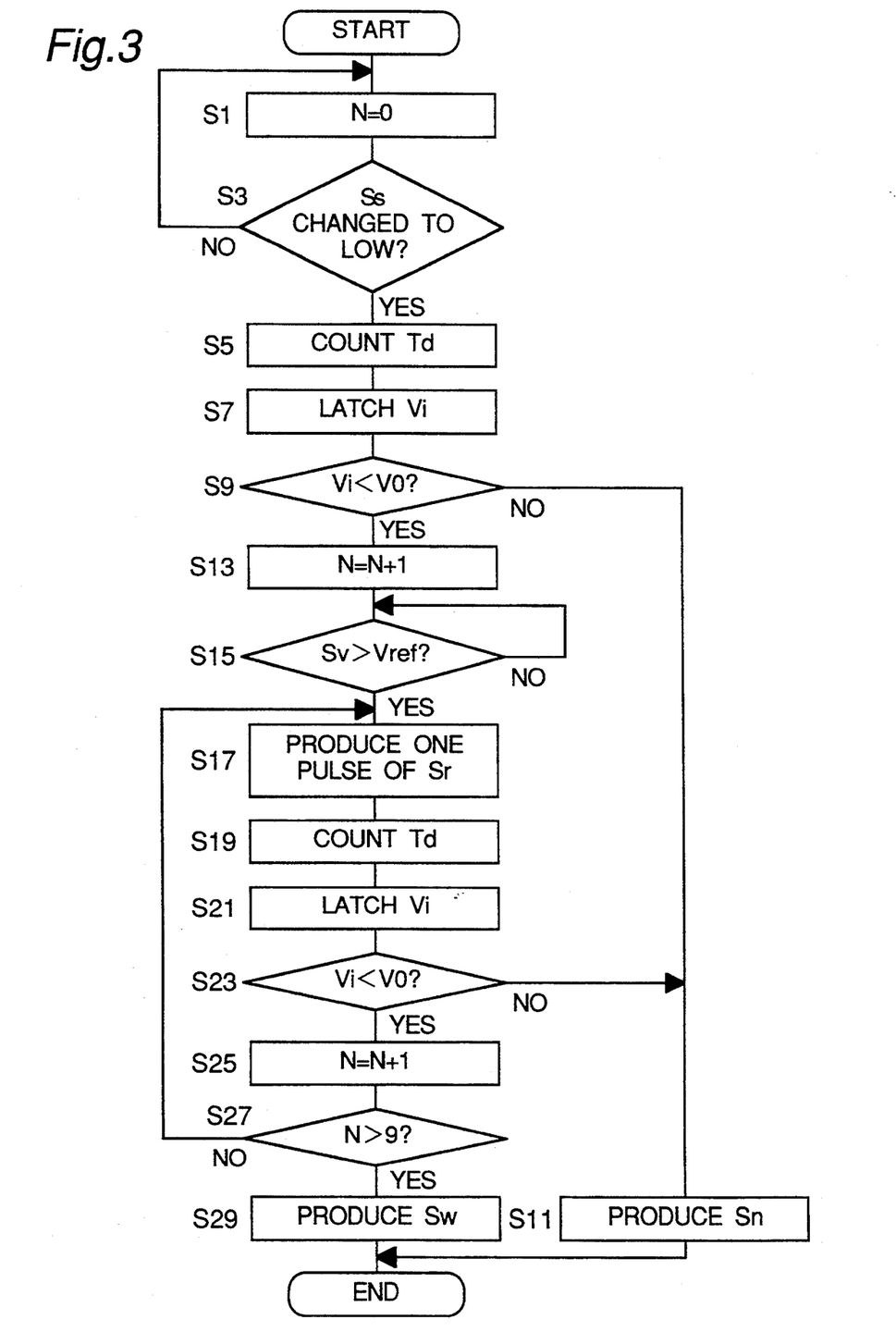
FIG. 3 is a flow chart showing the operation of the motor trouble detection device of FIG. 1.

Referring to FIG. 3, the operation of trouble detection unit 300 of FIG. 1 is shown. First, the ignition switch is turned on and the starter switch of sel-motor will be turned on for a period starting from time t1 to t2. The start detector 1 detects the operation of starter switch and outputs the starting signal Ss appearing high for the predetermined period T1 starting from time t2 to t3. On receipt of the high signal Ss, the motor driver 60 instructs the motor 30 to rotate at time t2 and to stop at time t3. At the same time, the trouble detection unit 300 receives the starting signal Ss through the input port INPUT 1, and operates as below.

At step S1, a trouble counter N is reset to "0". The trouble counter N indicates how may times the motor trouble is detected.

At step S3, it is judged whether the starting signal Ss is changed from high to low or not. It is judged "NO" meaning that the sel-motor does not rotate yet, the procedure returns to step S1. However, when the signal Ss is changed from high to low at time t3 meaning that the vehicle is prepared to move, it is judged "YES" And a level change signal is produced. Then, the procedures advances to step S5.

At step S5, a predetermined period Td is counted up from time t3 to time t4. It is to be noted that the motor 30 in rotation will not stop immediately even when the driver 60 instructs to stop, and the rotation of the motor 30 gradually slows down. According to the reduction of the rotational speed of the motor 30, the terminal voltage Vi will reduce gradually. Therefore, it is possible to judge whether the motor 30 is troubled or not based on the terminal voltage Vi at time t4.

At step S7, the terminal voltage Vi of the motor 30 input through the A/D converter 5 is latched at time t4.

At step S9, it is judged whether the latched voltage Vi is smaller than the reference voltage V0 or not. When it is judged "NO" meaning that the motor 30 is still rotating and is not troubled, the procedure advances to step S11.

At step S11, the quitting signal Sn is produced and transferred to the pulse generator 2e to stop the operation of the pulse generator 2e not to output the pulse signal Sr any more. Then, the procedure ends.

However, when the voltage Vi is not greater than the voltage Vi at step S9, it is judge "YES" meaning that the motor 30 is troubled, the procedure advances to step S13.

At step S13, the trouble counter N is incremented by "1".

At step S15, it is judged whether the detected speed signal Sv (Vi) is greater than the reference speed signal Vref or not. When it is "NO" meaning that the vehicle does not reach a predetermined speed, the procedure returns to step S15. However, when it is judge "YES", the procedure advances to step S17. Thus, the procedure circulates the loop of this step until the vehicle speed exceeds the predetermined velocity.

At step S17, the pulse generator 2e outputs a pulse of signal Sr having a pulse with of $(T2-T1)/9$ to the trouble detection unit 300 and the motor driver 60 through the lines L5 and L4, respectively. The motor driver 60 instructs the motor 30 to rotates for the predetermined period of $(T2-T1)/9$.

At step S19, a predetermined period Td is counted up from the motor driver 60 instructs the motor 30 to stop the rotation.

At step S21, the terminal voltage Vi of the motor 30 is latched.

At step S23, when it is judged whether the latched voltage Vi is smaller than the reference voltage V0 or not. When it is judged "NO", the procedure advances to step S11. However, when it is judged "YES", the procedure advances to step S25.

At step S25, the trouble counter N is incremented by "1".

At step S27, it is judged whether the trouble counter N is greater than a predetermined number, for example 9 (nine) in this embodiment, or not. When it is judged "YES", the procedure advances to step S29.

At step S29, the warning signal Sw is produced and output through the OUTPUT 2 for lighting the warning lamp 38. Then the procedure ends.

However, when it is judged "NO" at step S27, the procedure returns to step S17. When the motor 30 is troubled, the operation of the steps S17, S19, S21, S23, S25, and S27 are repeated 9 times. After the trouble counter N is incremented to 9 at step S25, and the procedure goes through step S29 to end.

Thus, when the motor 30 is judged as "no trouble" at step S9, the trouble detection operation is quit. However, even when the motor 30 is judged as "in trouble" at step S9, the motor 30 is further subject to the judgement at step S23 maximum 9 times by repeating a loop of the steps S17, S19, S21, S23, S25, and S27. Once the latched voltage Vi is judged as not smaller than the reference voltage V0 ("NO" at step 23) during the repeating of the loop, the motor trouble detection operation ends immediately. However, when it is judged "YES" at step S27, it is judged that the motor 30 is in trouble, and the warning signal Sw is output.

Figure 4:
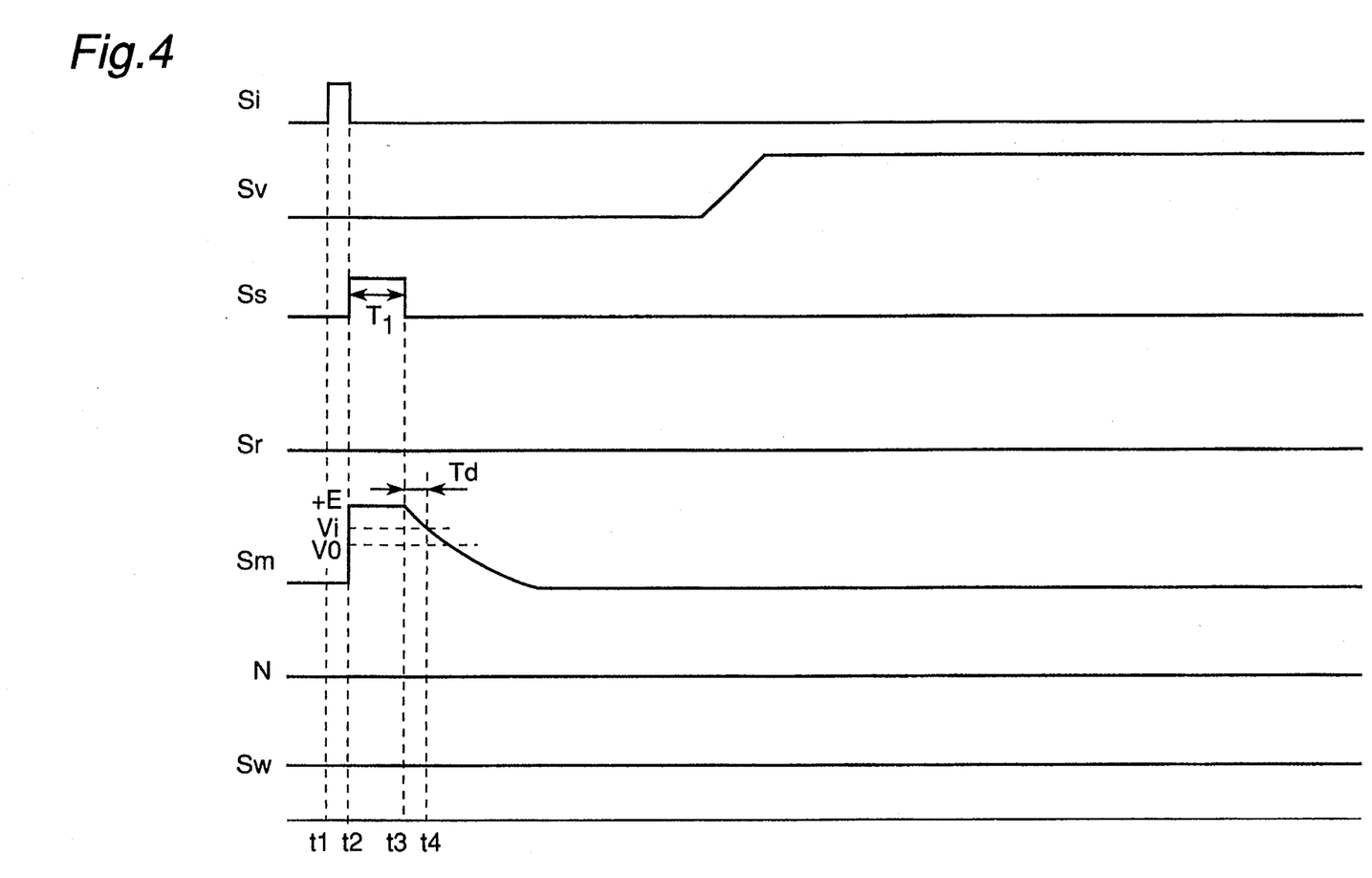
FIG. 4 is a graph showing the relationship between various signals observed in the motor trouble detection device of FIG. 1 when the motor is without trouble.
Figure 5:
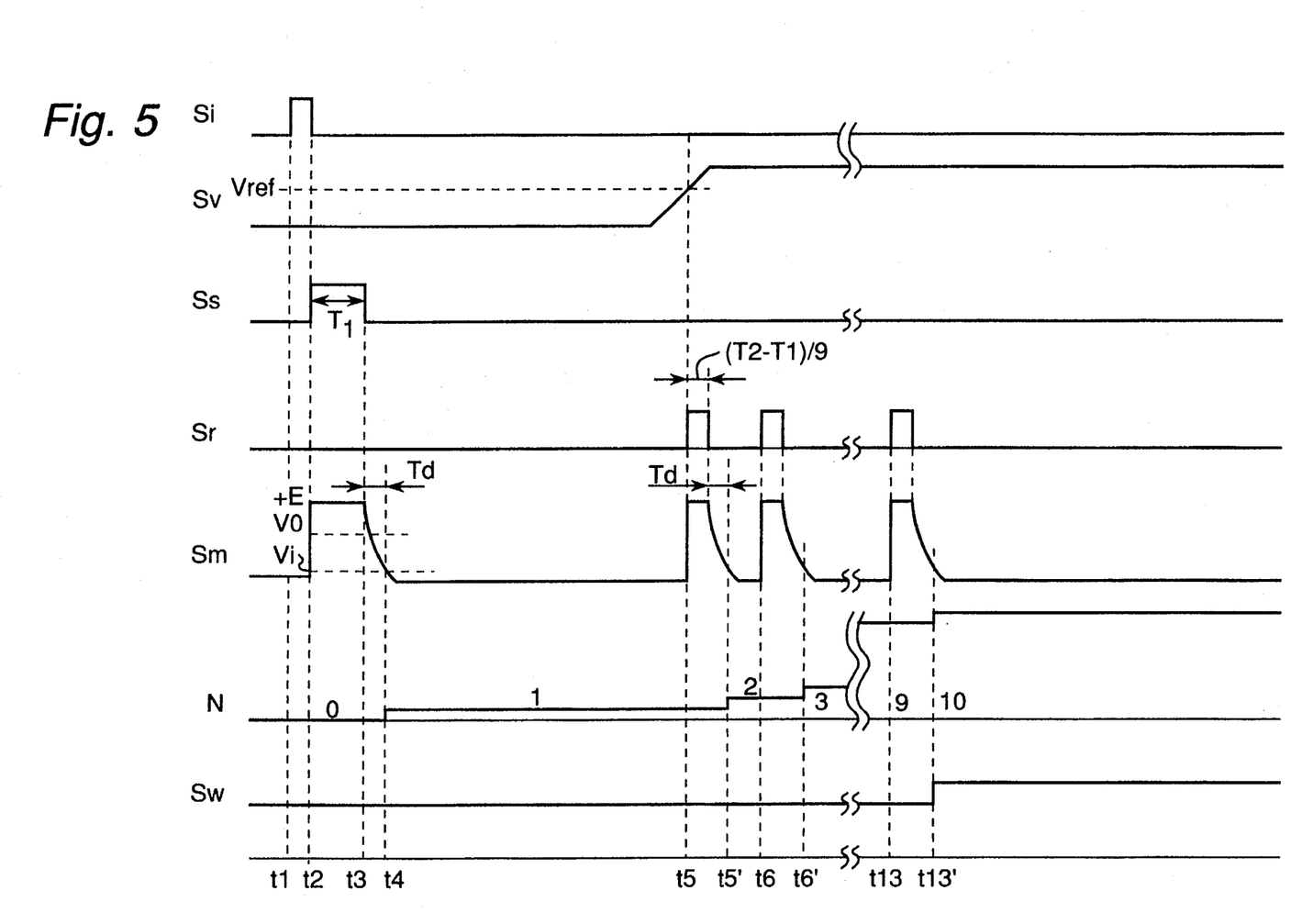
FIG. 5 is a graph showing the relationship between various signals observed in the motor trouble detection device of FIG. 1 when the motor is locked.

With reference to FIGS. 4 and 5, specific examples of the motor trouble detection operation is described.

In FIG. 4, a case that the motor 30 is not troubled is shown. As described above, the ignition signal Si changes from LOW to HIGH at time t1 and then returns LOW at time t2.

At time t2, the signal Ss changes from LOW to HIGH, and the motor 30 is instructed to rotate. Then the motor terminal signal sm changes from LOW to HIGH.

At time t3, the signal Ss returns LOW, and the motor 30 is instructed to stop rotating. Since the motor 30, in no trouble, reduces the rotating speed gradually from time t4, the motor rotation signal Sm reduces gradually according to the reduction of the rotating speed of the motor 30.

At time t4, period Td after the time t3, the motor terminal voltage Vi of the signal Sm becomes greater than the predetermined reference voltage V0. Therefore, the trouble counter N is not incremented and remains zero. The warning signal Sw is not output. And the quitting signal Sn (not shown in FIG. 4) is output to stop the motor trouble detection operation.

In FIG. 5, a case that the motor 30 is troubled, for example, such that the motor spindle is mechanically stalled is shown. From time t0 to t3, the operation is the same as that shown in FIG. 4.

At time t4, the motor terminal voltage Vi is smaller than the reference voltage V0 because the motor spindle is stalled, Therefore, it is judged "YES" at step S9, and the troubled counter is incremented to "1" at step S13. While the loop of step S19 is repeated, the vehicle speed Sv increases.

At time rS, the vehicle speed Sv exceeds the reference speed Vref (step SIS) and the first pulse of signal Sr is input to the trouble detection 300 and the motor driver 30 (step S17). On receipt of the first pulse, the motor driver 60 instructs the motor 30 to rotate for a period of (T2−T1)/9.

At time t5' which is a time after time t5 by the pulse width of (T2−T1)/9 and the delay time Td, the motor terminal voltage Vi (Sm) is smaller than the reference voltage V0 (step S23). Then, the trouble counter N is incremented to "2" (step S25), and the operation for a second pulse of the signal Sr is started (step S17) at time t6. It is to be noted that the period from t5 to t5' is the same as the pulse width (T2−T1)/9 of the signal Sr. Hereinafter, the period corresponding to the pulse width of the signal Sr is referred to as a "pulse period".

After this, the operation for the pulse period from time t5 to t5' is repeated at eight pulse periods respectively starting from t6 to t6', t7 to t7', t8 to t8', t9 to t9', t10 to t10', t11 to t11', t12 to t12', and t13 to t13' unless the terminal voltage Vi becomes greater than the reference voltage V0 (step S23) in any pulse period. Only three pulse periods are shown in FIG. 4 for the sake of brevity, and periods from t7 to t12 are omitted. At every ending time of pulse period t5', t6', t7', t8', t9', t10', t11', t12', and t13', the trouble counter is incremented by 1 and finally becomes 10 at time t13'.

Thus, according to this embodiment of the present invention, when the latched voltage Vi is not smaller than the reference voltage V0 ("NO" at step 23) at any of successive nine judging times t5', t6', t7', t8', t9', t10', t11', t12', and t13', it is judged that the motor 30 is not in trouble. Then, the motor trouble detection operation ends.

However, when the it is the latched voltage Vi is smaller than the reference voltage V0 ("YES" at step 23) every judging times t5', t6', t7', t8', t9', t10', t11', t12', and t13', it is judged "YES" at step S27 meaning that the motor 30 is in trouble, and the warning signal Sw is output.

Since the period T1 is set to a time long enough for the motor 30 and pump 31 to discharge the brake fluid fully stored in the reservoir 65 when the brake pedal 40 is not operated, the braking fluid is completed discharged from the reservoir 65 at time t3 if the brake pedal 40 is not operated. Therefore, the motor 30 gradually reduces the rotation at time t3 due to the inertia moment thereof, and the motor terminal voltage Vi gradually reduces accordingly. Thus, it can be judged that the motor 30 is not in trouble by the first judging time (at time t4 and step S9).

When an inertia moment of the motor 30 is so small, the motor 30 rapidly decreases its rotational speed after time t3. Accordingly, the motor terminal voltage Vi also decrease rapidly, resulting in that the voltage Vi is smaller than the reference voltage V0 at t4. Such a trouble may be caused by the stalling of the motor spindle, for example. Furthermore, pressing the brake pedal 40 causes the fluid pressure on the discharging side of the pump 31 so greater, so that the motor 30 is forced to a great load. In this case, it is impossible to properly judge whether the motor is in troubled or not only by one time of judgment.

In consideration of these case, according to this embodiment of the present invention, even if the motor trouble is detected at the first judgment time t4, the motor trouble is further judged at maximum 9 times t5', t6', t7', t8', t9', t10', t11', t12', and t13'. When the speed signal Sv exceeds the predetermined speed Vref at time t5, the vehicle speed detector 2 successively outputs 9 pulses at a predetermined interval so that the motor 30 is intermittently driven 9 times for the predetermined pulse period (T2−T1)/9. Therefore, the total period of 9 pulse periods is (T2−T1).

The total driving period for 10 times including the first periods T1 is T2. Since T2 is set to a period long enough for the pump 31 to discharge the brake fluid fully stored in the reservoir 65 even when the brake pedal 40 is operated, it is possible to completely discharge brake fluid from the reservoir 65 by intermittently driving the motor 30. In this case, before reaching the 10th judging step, the motor terminal voltage Vi gradually reduces, as shown in FIG. 4, and the motor 30 is judged as "not in trouble".

Figure 6:
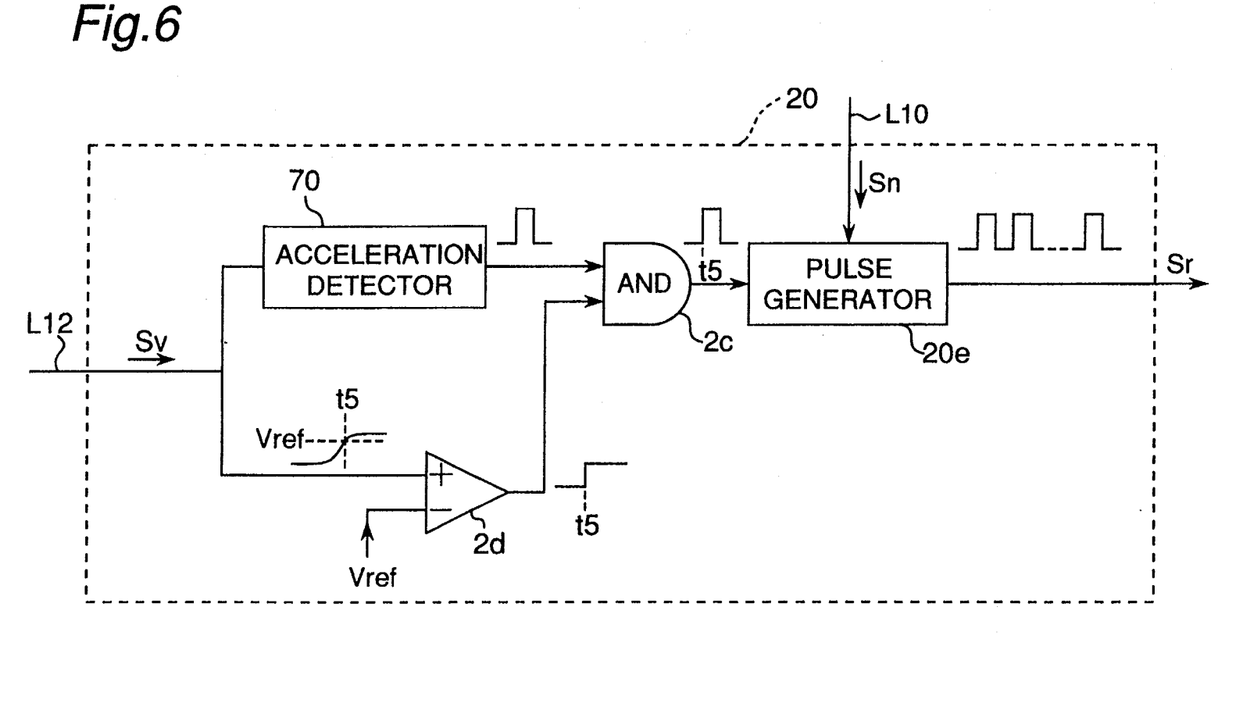
FIG. 6 is a block diagram showing a modification of the vehicle speed detector of FIG. 2.

Referring to FIG. 6, a vehicle speed detector 20 which is a modification of the vehicle speed detector 2 of FIG. 2 is shown. The vehicle speed detector 20 has a construction basically similar to that shown in FIG. 2. The capacitor 2a, latch 2b, and resistances 10R and R in FIG. 2 are removed, and an acceleration detector 70 is added. The acceleration detector 70 can be comprised of differentiating circuits, for example, to detect the acceleration of the detected vehicle speed Sv and produces a acceleration signal Sva. The acceleration detector 70 can be in a common use with the anti skid control unit 200. Also the pulse generator 2e comprised of a non-stable multivibrator is replaced by a pulse generator 20e comprised of one shot vibrator.

The acceleration detector 70 has an input port connected to the reference speed calculator 53 by the line L12 for receiving the detected speed signal Sv and an output port connected to one of input terminals of the AND-gate 2c.

Thus constructed vehicle speed detector 20 outputs one shot of pulse every time when the speed signal Sv is greater than the reference speed signal Vref and the positive acceleration is detected.

Figure 7:
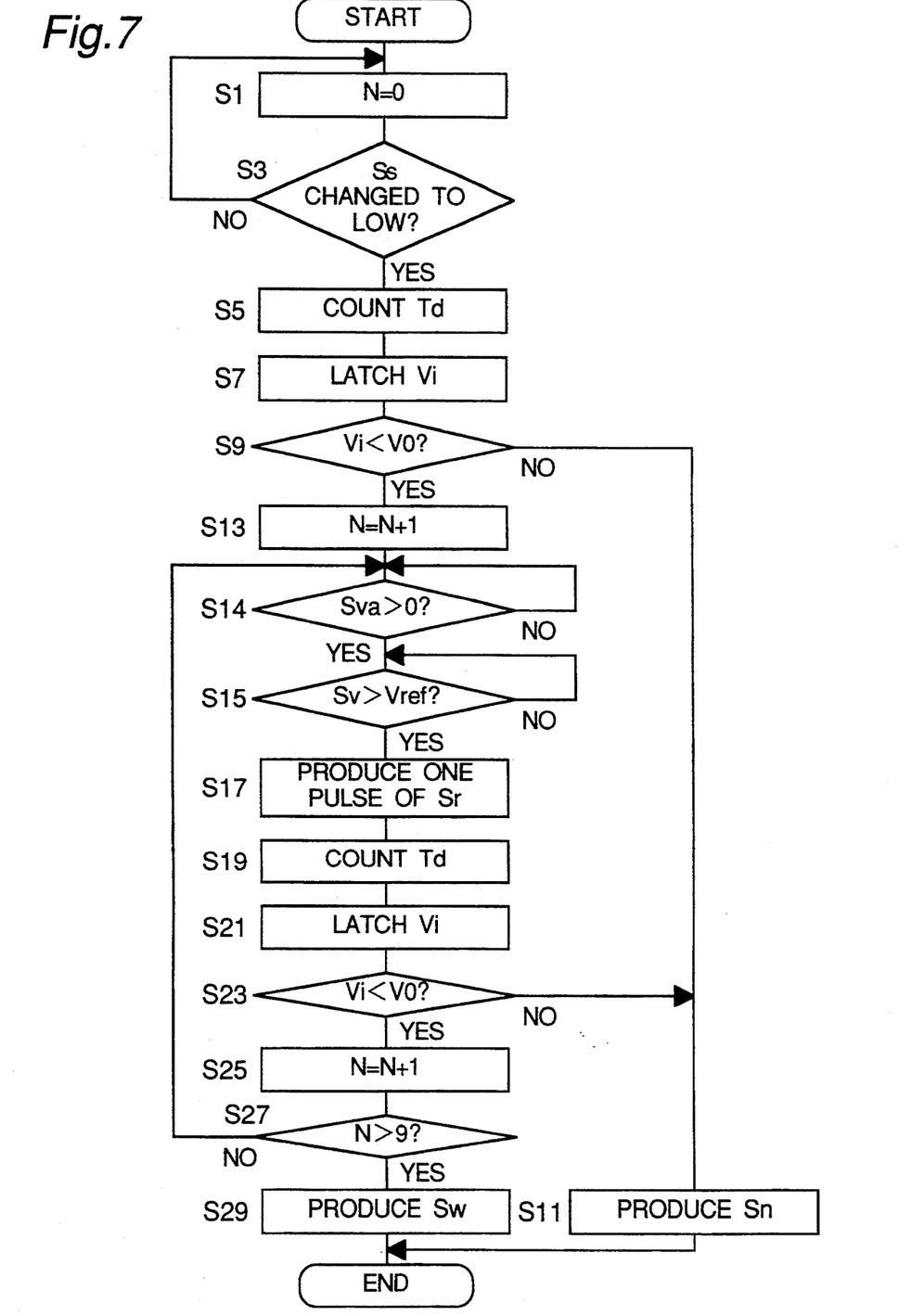
FIG. 7 is a flow chart showing the operation of the motor trouble detection device including the vehicle speed detector of FIG. 6.

Referring to FIG. 7, the flow chart of the motor trouble detection device wherein the modified vehicle speed detector 20 is incorporated is shown. The flaw chart in FIG. 7 is basically similar to that of FIG. 3, but a step S14 is added between step S13 and S15. Furthermore, the loop from step S27 returns to step S14 instead of step S17.

Since the operation of thus constructed device is similar to that shown by FIG. 3, only the different operation is described herebelow.

At step S14, it is judged whether the acceleration signal Sva is greater than zero or not. When it is judged "NO" meaning that the vehicle is coasting at a constant speed or decreasing the driving speed, the procedure returns step S14. However, it is "YES" meaning that the vehicle is increasing speed, the procedure advances to step S15. Therefore, the motor trouble judgement is made only when the vehicle exceeds the reference speed Vref while the vehicle is increasing the driving speed in this embodiment.

At step S27, when it is judged "NO", the procedure returns to step S14. When the motor 30 is troubled, the operation of the steps S14, S15, S17, S19, S21, S23, S25, and S27 are repeated every time when the vehicle speed Sv is greater than the reference speed Vref while the acceleration signal Sva is positive. Thus, the motor trouble detection device including the vehicle speed detector 20, the motor 30 is driving every time (Steps S14 and S15) when the vehicle speed exceeds the predetermined speed Vref while the vehicle is accelerated after the first trouble judging step (step S9). As a result, the noise and vibration generated by driving the motor 30 can be reduced.

It is to be noted that the motor 30 is driven long enough to bail up the brake fluid from the reservoir 65 completely when the anti skid control is terminated. It is a special case that brake fluid resident in the reservoir 65 at the starting time, such as that the pump system has a defect. Therefore, the first motor driving period T1 is used for make the motor 30 rotate at constant while the brake switch 41 is turned off or the brake pedal 40 is not operated. Thus, the generation of the noise and vibration due to the motor driving can be reduced.

However, while the brake stitch is tuned on, the motor 30 is loaded. In this case, in order to avoid detection error of the motor lock, the first motor driving period T1 is a period enough to release the motor 30 from the loaded fluid pressure, or to make the reservoir 65 empty.

When the brake switch 41 is out of order, it may be assumed that the motor is not loaded while the brake pedal 40 is operated actually. In this case, it is judged that the motor is locked in error. To avoid such a problem, it is possible to drive the motor again when the defect of brake switch is detected.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A motor trouble detection device for use in an anti-skid brake control system for releasing a wheel of a vehicle from a locked condition such that brake fluid in a master cylinder is forcibly discharged to a reservoir tank, and the brake fluid in the reservoir tank is further returned to the master cylinder by a pump driven by a motor, said device comprising:
   voltage detection means for detecting a counter electromotive force generated by said motor;
   first judging means for judging whether said detected counter electromotive force is smaller than a predetermined voltage when said motor is turned off; and
   second judging means for judging whether said motor is in trouble based on the judged result by said first judging means 2. A motor trouble detection device according to claim 1, wherein said first judging means comprises third judging means for judging whether said detected counter electromotive force is smaller than said predetermined voltage when said vehicle is started.

3. A motor trouble detection device according to claim 2, wherein said motor is turned off after driving for a first predetermined period long enough for said pump to fully discharge the brake fluid stored in said reservoir tank when the pressure on the discharging side of said pump is equal to the atmospheric pressure.

4. A motor trouble detection device according to claim 2, wherein said first judging means further comprises fourth judging means for repeatedly judging whether said detected counter electromotive force is smaller than said predetermined voltage after said third judging means judges that said detected counter electromotive force is smaller than said predetermined voltage.

5. A motor trouble detection device according to claim 4, wherein said motor is turned off after driving for a second predetermined period long enough for said pump to fully discharge the brake fluid stored in said reservoir tank when the pressure applied to the discharging side of said pump is greater than the atmospheric pressure.

6. A motor trouble detection device according to claim 5, wherein said motor is driven for a third predetermined period long enough for said pump to fully discharge the brake fluid stored in said reservoir tank.

7. A motor trouble detection device according to claim 1, further comprising stop means for stopping the operation of said detecting device when said second judging means judges that said motor is not in trouble.

8. A motor trouble detection device according to claim 1, further comprising first trouble detection means for detecting that said motor is in trouble when said first judging means judges that said detected counter electromotive force is smaller than said predetermined voltage.

9. A motor trouble detection device according to claim 2, wherein said first judging means further comprises a fourth judging means for judging whether said detected counter electromotive force is smaller than said predetermined voltage when the driving speed of said vehicle exceeds a predetermined speed.

10. A motor trouble detection device according to claim 1, further comprising:

drive signal producing means for producing a drive signal instructing said motor to rotate;

level detection means for detecting a level of said driving signal;

latch means for latching said counter electromotive force when said level detection means detects that the level of said driving signal changes from a first level to a second level and for providing a latched signal; and comparator means for comparing the voltage of said latched signal with said predetermined voltage.

11. A motor trouble detection device according to claim 3, further comprising a stop switch operated by a braking operation, wherein said first predetermined period is a minimum period necessary for said motor to rotate at a constant speed when said stop switch is turned off.

12. A motor trouble detection device according to claim 11, wherein said first predetermined period is long enough for said motor to fully discharge the brake fluid stored in said reservoir tank when said stop switch is turned ON.

13. A motor trouble detection device according to claim 11, further comprising second detection means for detecting that said stop switch is defective, wherein said motor is driven, regardless of the judged result of said first judging means, when said second detection means detects that said stop switch is defective.

* * * * *